United States Patent [19]
Jenkins

[11] Patent Number: 4,850,772
[45] Date of Patent: Jul. 25, 1989

[54] FRICTION-WELDABLE STUD

[75] Inventor: John C. Jenkins, Lorain, Ohio

[73] Assignee: TRW Inc., Cleveland, Ohio

[21] Appl. No.: 182,027

[22] Filed: Apr. 15, 1988

[51] Int. Cl.$^4$ .............................................. B23K 20/12
[52] U.S. Cl. ...................................... 411/171; 228/2; 279/89
[58] Field of Search ................ 228/2; 156/7; 411/171; 279/1 G, 9 R, 89

[56] References Cited

U.S. PATENT DOCUMENTS

| | | | |
|---|---|---|---|
| 3,616,980 | 11/1971 | Padilla | 228/2 |
| 3,824,145 | 7/1974 | Flax | 228/2 X |
| 4,657,626 | 4/1987 | Cearlock et al. | 228/2 X |
| 4,702,405 | 10/1987 | Thomson et al. | 228/2 |

*Primary Examiner*—Kenneth J. Ramsey
*Attorney, Agent, or Firm*—Allen D. Gutchess, Jr.

[57] ABSTRACT

A friction-weldable stud is provided. The stud includes an elongate body having a collar or skirt located around the body and extending outwardly therefrom. The collar has a first surface facing in one direction toward one end of the body, with the surface having an engagable configuration for engagement by a cooperating configuration of a chuck of a welding tool. The tool can thereby rotate the stud and also apply an axial force to it through the chuck and collar. The collar has a second surface facing away from the first surface preferably with an annular groove which helps shape the weld material and control flash during the welding. The body also has a friction-weldable nose or end extending outwardly from the collar in the direction of the axis of the elongate body by means of which the stud can be affixed to a workpiece by a friction-welding technique. The surface of the nose has a plurality of ridges thereon which are designed to help clean the surface of the workpiece as the stud is rotated during the welding operation. The stud can be made in one piece or in two pieces with the body of the stud and the collar being separate. The collar and the body then can be made of different materials.

24 Claims, 3 Drawing Sheets

FRICTION-WELDABLE STUD

This invention relates to a friction-weldable stud and more particularly to such a stud having a collar or skirt thereon through which rotational and axial forces can be applied to the stud, the skirt also controlling and shaping weld metal and flash produced during the friction-welding operation.

Friction welding of studs to workpieces by causing relative movement between the stud and the workpiece and by producing pressure between the stud and the workpiece has been known in the art. This welding technique does not require the use of electrical power which has certain advantages in some instances, such as enabling studs to be welded under water. The technique also enables studs to be welded to workpieces of different materials and enables studs to be welded through metal or other sheets, coatings, and other layers. The material of which the studs are made also need not be electrically conducting.

Heretofore, studs which have been friction welded to workpieces have had intermediate, non-circular portions which are engaged by a chuck of a welding tool to rotate the studs at the requisite high speeds. The axial force applied by the tool to the studs to establish the high pressure between the studs and the workpiece has been applied through the ends of the studs opposite the weldable ends. This required that chucks of different sizes had to be used for studs of different lengths or other adjustments had to be made to the tool to accommodate the different lengths.

The friction-weldable stud in accordance with the invention includes an elongate body having an outer end and a weldable end of a shape suitable to be friction welded to a workpiece. The body has a collar or skirt located at an intermediate portion and extending outwardly therefrom. The collar has a first surface facing toward the outer end of the body with this surface being positioned transversely to an axis of the stud body. This surface can then be engaged by the chuck to place an axial force on the stud to produce the requisite high pressure between the stud and the workpiece. Most importantly, this is achieved completely independently of the stud length. Therefore, no tool changes are necessary to accommodate studs of different lengths. The collar also has engagement by cooperating means of the chuck whereby the tool can cause relative movement between the stud and the workpiece, usually by rotating the collar through the chuck. The engagable means on the collar can take several forms. For example, the surface can have outwardly-extending flutes or shoulders thereon which can be engaged by cooperating flutes or shoulders on the welding tool chuck. The collar surface can also have circumferentially spaced notches therein to receive corresponding pins in the chuck. Spline and groove combinations and other combinations are also possible. The engagable means can also be a non-circular portion of the stud adjacent the collar.

The collar also has a second surface facing toward the weldable end of the body with this surface preferably having an annular groove therein. The collar controls plasticized material or flash in the plastic state during the welding operation to prevent it from reaching portions of the shank of the body beyond the collar. The groove also helps to control the shape of the plasticized material as it is formed during the welding operation. The shape of the groove in transverse cross section can be semi-circular, square or V-shaped, by way of illustration, the shape not being critical to the function of the groove and collar.

The weldable end of the stud body is not smooth but, rather, has ridges therein. The ridges preferably extend over the entire end of the body and function to clean the surface of the workpiece as the stud is welded thereto. The ridges are positioned to move transversely relative to the surface of the workpiece as the stud is rotated or similarly moved during the welding operation so that the ridges tend to "sweep" the workpiece surface and dispense coatings or dirt or other contaminants thereon. The ridges also can be hardened to cut through material such as metal decking or other sheets.

It is, therefore, a principal object of the invention to provide a friction-weldable stud having a surface through which rotational and axial forces can be applied during a friction-welding operation, independently of the length of the stud.

Another object of the invention is to provide a friction-weldable stud with a collar extending outwardly therefrom spaced from a weldable end thereof, through which collar both rotational and axial forces can be applied by a chuck of a welding tool.

Yet another object of the invention is to provide a friction-weldable stud having a collar thereon spaced from a weldable end of the stud and effective to control plasticized material formed in a welding operation.

Yet a further object of the invention is to provide a friction-weldable stud having a groove spaced from a weldable end to help shape plasticized material formed during the welding operation.

Still another object of the invention is to provide a friction-weldable stud having ridges on a weldable end thereof which aid in cleaning the surface of a workpiece during the welding operation.

Many other objects and advantages of the invention will be apparent from the following detailed description of preferred embodiments thereof, reference being made to the accompanying drawings, in which.

Figure 1:
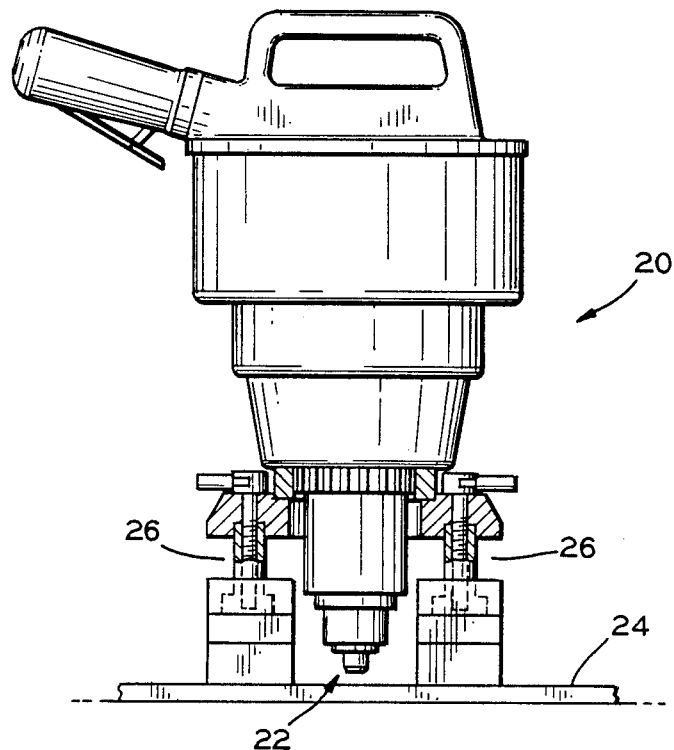
FIG. 1 is a schematic view in elevation, with parts broken away, of apparatus for welding a stud in accordance with the invention to a workpiece.

Referring to the drawings, and particularly to FIG. 1, a welding tool indicated at 20 is used to weld a friction-weldable stud 22 to a workpiece 24. The welding tool can be of the types shown in application PCT GB86/00241 and PCT GB86/00242, or other types known in the art. The tool 20 can be powered by air and need not require electrical power, so that the tool can be used to friction-weld studs underwater, by way of example. The friction welding also enables studs and workpieces of different materials to be welded together, and electrically conducting material is not a requirement. The friction welding tool 20 has means for providing relative movement between the stud and the workpiece, usually by rotating the stud at high speed, in a range of 6,000–12,000 rpm, for example. The tool 20 also has means for applying axial force to the stud to establish high pressure between a weldable end of the stud and the workpiece. Toward this purpose, the tool 20 is clamped to the workpiece 24 by suitable clamping assemblies 26.

Figure 2:
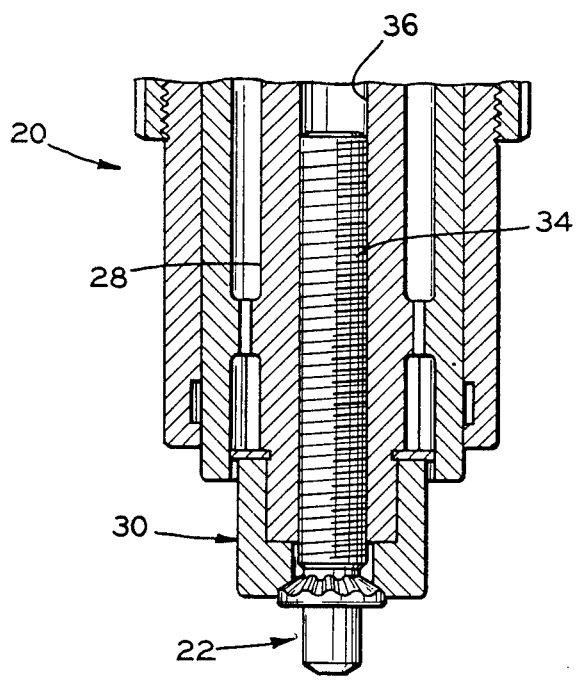
FIG. 2 is a greatly enlarged, fragmentary, somewhat schematic view in vertical section taken through a chuck portion of the tool of FIG. 1.
Figure 3:
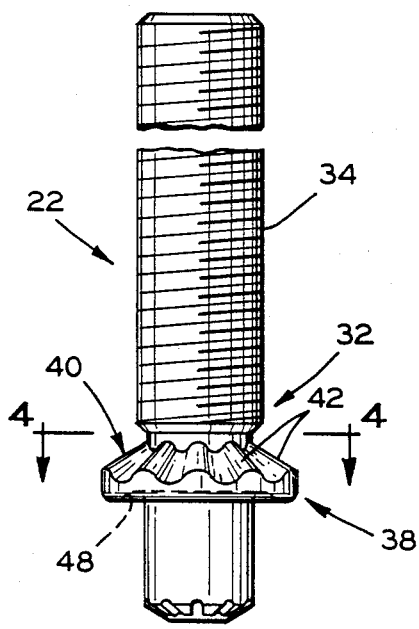
FIG. 3 is a view in elevation, with parts broken away, of a friction-weldable stud in accordance with the invention.
Figure 7:
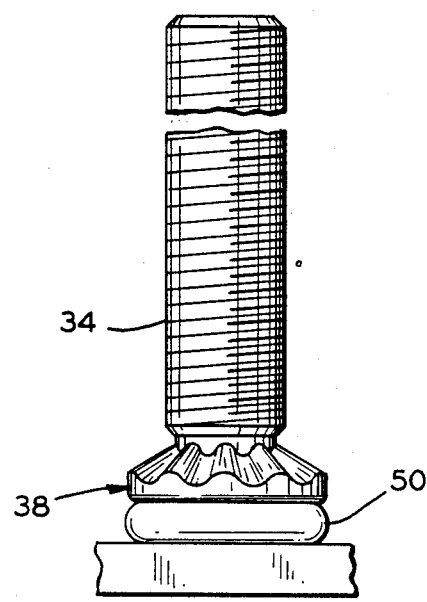
FIG. 7 is a view in elevation, with parts broken away, of the stud of FIG. 3 and a workpiece, after the stud has been friction welded thereto.
Figure 4:
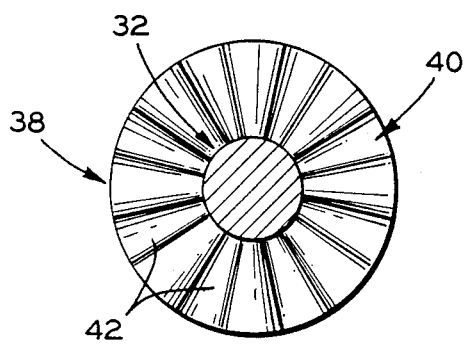
FIG. 4 is an enlarged view in horizontal cross section taken along the line 4—4 of FIG. 3.
Figure 5:
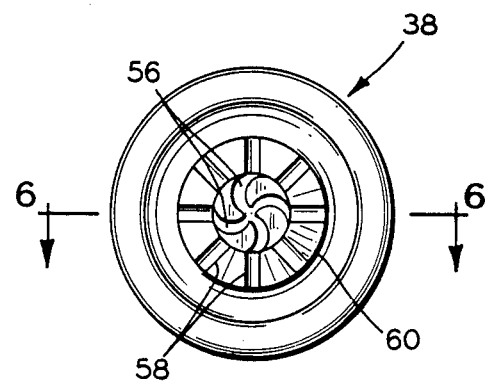
FIG. 5 is an enlarged bottom view of the stud of FIG. 3.
Figure 6:
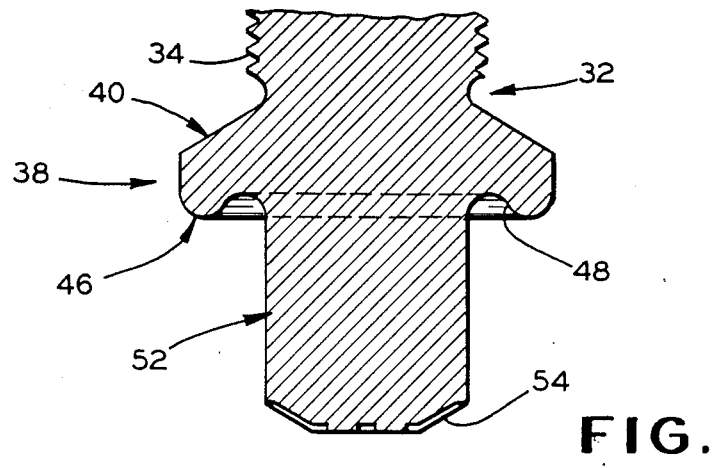
FIG. 6 is an enlarged fragmentary view in vertical cross section taken along the line 6—6 of FIG. 5.

Referring to FIG. 2, the tool 20 has a drive shaft 28 carrying a chuck 30 through which both rotational and axial forces are applied to the stud 22.

Referring to FIGS. 3–7, the friction-weldable stud 22 has an elongate body 32, with the body having a threaded shank 34 of variable length, depending upon the particular needs of the application. Referring to FIG. 2, the shank 34 extends upwardly through a bore 36 of the drive shaft 28 and does not abut an end of the bore 36. Heretofore, pressure applied through the stud to the workpiece has been through the end of the stud. Consequently, for studs of different lengths, different chucks or shafts have had to be employed or other tool adjustments or sleeves had to be fitted in the bore 36 to accommodate the different length studs. In the present instance, however, the stud 34 can be of substantially any length, as long as it does not exceed the length of the bore 36.

Figure 8:
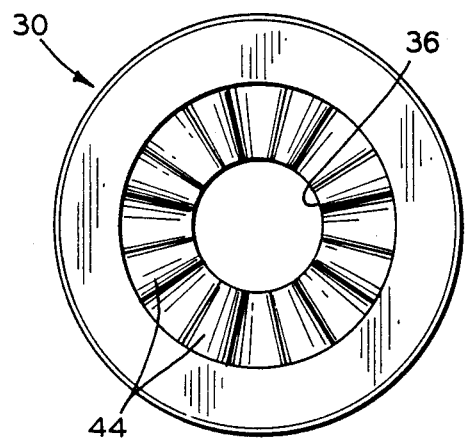
FIG. 8 is an end view of a chuck of the welding tool of FIG. 2 used to engage and drive the stud of FIGS. 3–7.

To achieve this, a collar or skirt 38 is located on an intermediate portion of the elongate body 32, at the end of the shank 34. The collar extends outwardly from the body and forms a first surface 40 facing toward the shank 34 and the outer end of the elongate body 32. The surface 40 extends transversely to a longitudinal axis of the elongate body 32 so that an axial force in the direction of the axis of the body 32 can be applied to the stud through the surface 40. The pressure between the stud and the workpiece can thus be achieved independently of the length of the body or shank. The surface 40 of the collar 38 also has engagable means by means of which rotational or similar forces can be applied to the stud 22 through the chuck 30 of the tool 20. In the particular instance, this is achieved by flutes 42 on the surface 40 which extend generally radially outwardly from the body 32 to the peripheral edge of the collar 38. Referring to FIG. 8, the chuck 30 has cooperating flutes 44 which nest with collar flutes 42 to cause the collar 38 and the stud 22 to rotate with the chuck 30 to provide the requisite high rotational speeds or other relative movement between the stud and the workpiece.

The collar 38 has a second surface 46 facing toward the other end of the elongate body 32 in a direction opposite to the first surface 40. The second surface 46 has an annular groove or channel 48 therein which helps to shape and control the plasticized material or flash produced during the friction-welding operation which welds the stud to the workpiece. While the groove is shown as being semi-circular in cross section, it can also assume other shapes, such as being rectangular or triangular. The overall collar 38 also helps to control the shape of the plasticized material and prevents flash from extending beyond the collar 38 and interfering with the functional shank 34 of the stud. The final shape of the weld material after the welding operation is completed is shown at 50 in FIG. 7.

The elongate body 32 of the stud also has a friction-weldable nose or projection 52 which extends outwardly in the direction of the axis of the stud away from the second surface 46 of the collar. An end 54 of the weldable nose 52 is suitable shaped so as to be friction welded to the surface of the workpiece 24. As shown, the end 54 is of a generally frusto-conical shape, but can be more pointed, rounded, or generally squared off, for example, and still be capable of being friction welded to the workpiece.

In accordance with the invention, the end 54 of the nose 52 has ridges or serrations which extend generally radially and, in any event, are positioned transversely to the relative movement of the stud and the workpiece so that the ridges tend to sweep over the workpiece surface during the relative movement and dispense coatings, dirt or other contaminants thereon, moving them in a radial outwardly direction. As shown, the tip of the stud end 54 has ridges or serrations 56 (FIG. 5) and the conical portion has generally radially-extending ridges or serrations 58. Again, the configuration and position of the ridges is not critical, as long as the ridges move transversely to the direction of movement of the stud. The ridges do, however, preferably extend outwardly completely to a peripheral surface 60 of the stud nose 52 so that the cleaning or sweeping action of the ridges occurs throughout the contact of the nose end 54 and the workpiece surface. The ridges may also be specially shaped and heat-treated or otherwise hardened so as to cut through material such as metal decking or other sheets above the workpiece to which the stud is to be welded.

Figure 9:
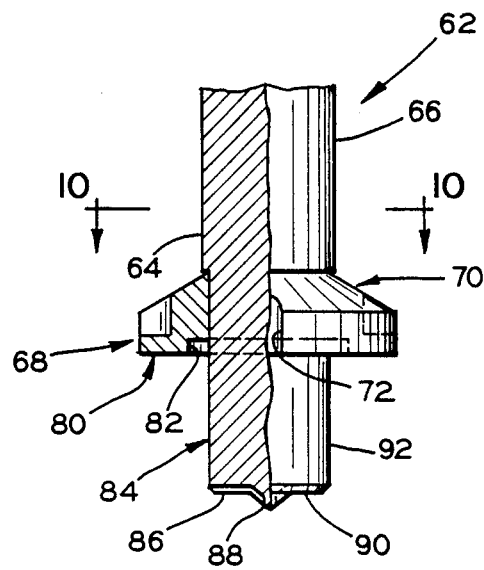
FIG. 9 is a view in elevation, with parts broken away and with parts in section, of a modified friction-weldable stud in accordance with the invention.
Figure 10:
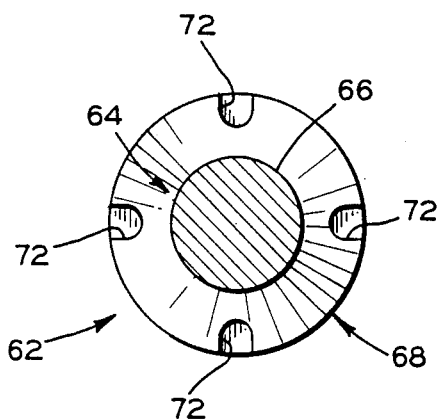
FIG. 10 is a view in cross section taken along the line 10—10 of FIG. 9.

A modified friction-weldable stud in accordance with the invention is indicated at 52 in FIGS. 9 and 10. The stud 62 has an elongate body 64 with a shank 66 which is cylindrical but not threaded, in this instance. Both the shank shape and the shank length are immaterial from the standpoint of the friction-welding operation.

The friction-weldable stud 62 has a collar or skirt 68 which, in this instance, is a separate part from the elongate body 64 of the stud 62. The collar 68 can be affixed to the elongate body 64 by a variety of means, such as threading, staking, by splines, or adhesives. The main advantage of the two-piece construction is that the stud and the collar can be of different materials to meet a wider variety of requirements for the stud welding applications in which the stud will be used.

Figure 11:
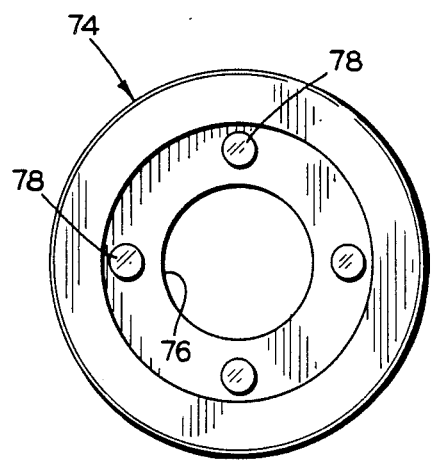
FIG. 11 is an end view of a chuck employed to engage the stud of FIGS. 9 and 10.

The collar 68 has a first surface 70 extending transversely to an elongate axis of the elongate body 64 so that an axial force can be applied to the collar 68 to achieve the requisite pressure between the stud and workpiece independently of stud length. In this instance, in order to rotate or provide similar relative movement between the stud 62 and the workpiece, the collar 68 has peripheral notches 72 therein, four being shown, which are of generally U-shaped configuration as viewed from above but which can be of many other suitable shapes, numbers, and positions in the collar 68. In order to rotate the collar 68 and the stud 62, a modified chuck 74 is shown in FIG. 11. The chuck 74 has a central bore 76 and has four matching pins 78 projecting therefrom which are received in the notches 72 of the collar 68.

The collar 68 also has a second surface 80 facing in the direction opposite the first surface 70. The surface 80 has an annular groove 82 of a rectangular shape in transverse cross section, in this instance, located adjacent the elongate body 64. Again, the surface 80 and the groove 82 serve to control and shape the weld metal and flash produced during the friction welding operation.

A friction-weldable nose or projection 84 on the elongate body 64 extends in an axial direction away from the second collar surface 80. The nose 84 has an end 86 which, in this instance, is generally square with a central pointed portion 88. Suitable ridges or serrations 90 are also located on the end 86 to aid in cleaning the surface of the workpiece of contaminants, dirt, films, etc. The ridges extend outwardly to a perpheral surface 92 of the stud nose 84 to assure that cleaning will occur during most of the welding operation.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. A friction-weldable stud comprising a body having an axis, a collar located on said body and extending outwardly therefrom, said collar having a first surface facing in one direction, said first surface being positioned transversely to the axis of the body for engagement by a chuck of a welding tool, said stud having engagable means for engagement by cooperating means of the chuck of the welding tool, whereby the tool can move said stud relative to a workpiece and apply an axial force to the stud through the chuck, said collar having a second surface facing away from said first surface, said second surface having an annular groove therein, the center of which is coaxial with the body axis, and said body having a friction-weldable nose extending outwardly from said second surface in the direction of the body axis.

2. A friction-weldable stud according to claim 1 characterized by said engagable means of said stud being on said first surface of said collar.

3. A friction-weldable stud comprising a body having an axis, a collar located on said body and extending outwardly therefrom, said collar having a first surface facing in one direction, said first surface being positioned transversely to the axis of the body for engagement by a chuck of a welding tool, said stud having engagable means for engagement by cooperating means of the chuck of the welding tool, whereby the tool can move said stud relative to a workpiece and apply an axial force to the stud through the chuck, said collar having a second surface facing away form said first surface, and said body having a friction-weldable nose extending outwardly from said second surface in the direction of the body axis, an end of said friction-weldable nose having ridges thereon positioned to clean a surface of a workpiece to which the stud is to be welded.

4. A friction-weldable stud according to claim 1 characterized by said body and said collar being made of the same material.

5. A friction-weldable stud according to claim 1 characterized by said body and said collar being of one-piece construction.

6. A friction-weldable stud according to claim 1 characterized by an end of said friction-weldable nose having ridges thereon positioned to clean a surface of a workpiece to which the stud is to be welded.

7. A friction-weldable stud according to claim 6 characterized by said ridges extending completely across the end of said friction-weldable nose.

8. A friction-weldable stud comprising an elongate body having an axis, said body having a first surface located at an intermediate portion of said body and extending outwardly therefrom, said first surface facing toward one end of said body for engagement by a chuck of a welding tool, said stud having engagable means for engagement by cooperating means of the chuck, whereby the tool can move said stud relative to a workpiece and apply an axial force to it through the chuck, said body having a second surface facing toward the other end of said body, said second surface having an annular groove therein, the center of which is coaxial with the axis of said elongate body, said other end of said body having a shape suitable for friction welding said stud to a workpiece.

9. A friction-weldable stud according to claim 8 characterized by said other end of said body having ridges on the surface thereof.

10. A friction-weldable stud comprising an elongate body having an axis, said body having a first surface located at an intermediate portion of said body and extending outwardly therefrom, said first surface facing toward one end of said body for engagement by a chuck of a welding tool, said stud having engagable means for engagement by cooperating means of the chuck, whereby the tool can move said stud relative to a workpiece and apply an axial force to it through the chuck, said body having a second surface facing toward the other end of said body, said other end of said body having a shape suitable for friction welding said stud to a workpiece, said other end of said body having ridges on the surface thereof.

11. A friction-weldable stud according to claim 10 characterized by said ridges extending completely across said other end of said body.

12. A friction-weldable stud according to claim 8 characterized by said first and said second surfaces being formed by a collar, said body and said collar being made of the same material.

13. A friction-weldable stud according to claim 8 characterized by said first surface and said second surface being formed by a collar, said body and said collar being of one-piece construction.

14. A friction-weldable stud according to claim 8 characterized by said engagable means of said stud being on said first surface of said body.

15. A friction-weldable stud comprising an elongate shank of substantially uniform cross section throughout its length, a collar extending outwardly from said shank near one end thereof, said collar having a first surface facing toward the other end of said shank, said stud having engagable means, said first surface and said engagable means being engagable by a cooperating surface of a welding tool chuck, whereby the tool can rotate said stud and apply an axial force to it through the chuck, said collar having a second surface facing away from said other end of said shank, said second surface having an annular groove therein, and a weldable nose extending from said collar in a direction away from said shank, said nose having an axis which is substantially coaxial with an axis of said shank.

16. A friction-weldable stud according to claim 15 characterized by said engagable means of said stud being on said first surface of said collar.

17. A friction-weldable stud according to claim 15 characterized by weldable nose having ridges on an end portion thereof adapted to engage a surface of a workpiece to which the stud is to be welded to clean the surface as the stud is moved relative thereto.

18. A friction-weldable stud according to claim 17 characterized by said ridges extending completely across the end of said weldable nose.

19. A friction-weldable stud according to claim 17 characterized further by said ridges being hardened to cut through material on the workpiece.

20. A friction-weldable stud according to claim 15 characterized by said shank and said collar being made of the same material.

21. A friction-weldable stud according to claim 15 characterized by said shank and said collar being of one-piece construction.

22. A friction-weldable stud comprising an elongate shank, a collar extending outwardly from said shank near one end thereof, said collar having a first surface facing toward the other end of said shank, said first surface having engagable means being engagable by a cooperating surface of a welding tool chuck, whereby the tool can rotate said stud and apply an axial force to it through the chuck, said first surface being of truncated, conical configuration and sloping away from said other end of said shank, said collar having a second surface facing away from said other end of said shank, and a weldable nose extending from said collar in a direction away from said shank, said nose having an axis which is substantially coaxial with an axis of said shank.

23. A friction-weldable stud comprising an elongate shank, a collar extending outwardly from said shank near one end thereof, said collar having a first surface facing toward the other end of said shank, said first surface having radially-extending grooves extending substantially from said shank to the periphery of said collar and being engagable by a cooperating surface of a welding tool chuck, whereby the tool can rotate said stud and apply an axial force to it through the chuck, said collar having a second surface facing away from said other end of said shank, and a weldable nose extending from said collar in a direction away from said shank, said nose having an axis which is substantially coaxial with an axis of said shank.

24. A friction-weldable stud comprising an elongate shank, a collar extending outwardly from said shank near one end thereof, said collar having a first surface toward the other end of said shank, said first surface having engagable means being engagable by a cooperating surface of a welding tool chuck, whereby the tool can rotate said stud and apply an axial force to it through the chuck, said collar having a second surface facing away from said other end of said shank, and a weldable nose extending from said collar in a direction away from said shank, said nose having an axis which is substantially coaxial with an axis of said shank, and being of cylindrical configuration throughout a substantial portion of its length.

* * * * *